Figure 1:
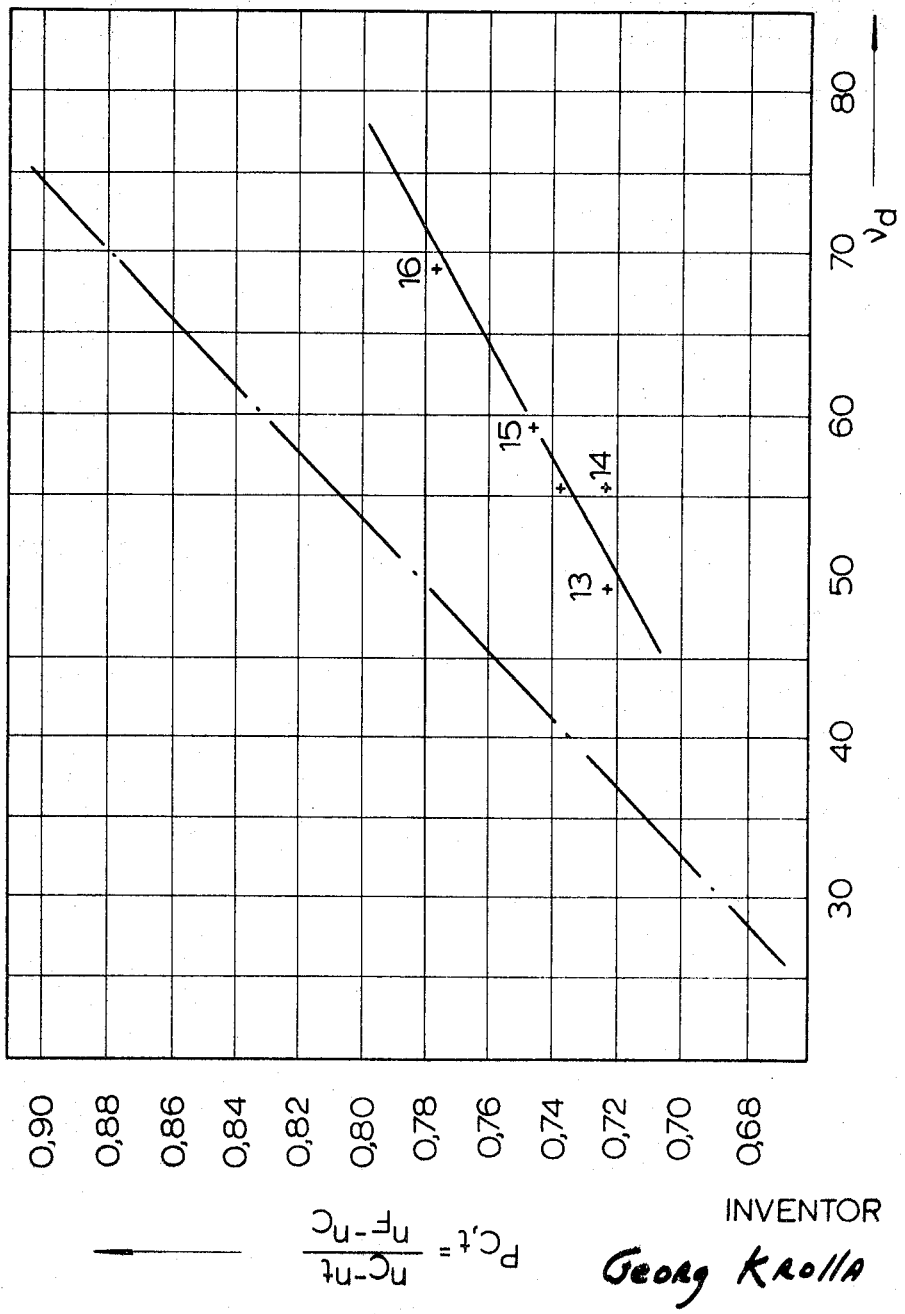

United States Patent

[11] 3,615,764

| [72] | Inventor | Georg Krolla |
| | | Mainz-Mombach, Germany |
| [21] | Appl. No. | 809,507 |
| [22] | Filed | Mar. 24, 1969 |
| [45] | Patented | Oct. 26, 1971 |
| [73] | Assignee | JENAer Glaswerk Schott S. Gen. |
| | | Mainz, Germany |
| [32] | Priority | Mar. 30, 1968 |
| [33] | | Germany |
| [31] | | P 17 71 080.4 |

[54] ARSENIC PENTOXIDE GLASS COMPOSITIONS
25 Claims, 4 Drawing Figs.

[52] U.S. Cl. .................................................. 106/47 Q
[51] Int. Cl. .......................................... C03c 3/00,
C03c 3/12, C03c 3/18

[50] Field of Search ........................................... 106/47, 52;
23/53, 144

[56] References Cited
UNITED STATES PATENTS
2,477,649  8/1949  Pincus ........................... 106/47
2,255,109  9/1941  Fischer ......................... 106/47 X

*Primary Examiner*—Tobias E. Levow
*Assistant Examiner*—M. Bell
*Attorney*—Burgess, Dinklage & Sprung

ABSTRACT: Optical glass compositions comprising 8 to 60 percent by weight arsenic pentoxide and 40 to 92 percent by weight simple and/or complex inorganic fluorides.

ARSENIC PENTOXIDE GLASS COMPOSITIONS

The present invention relates to optical glass compositions comprising arsenic pentoxide and inorganic fluorides.

It is known that arsenic (V)-oxide is possessed of glass-forming properties. Most glasses manufactured on this basis, however, exhibit considerable disadvantages including the following:

1. they are hygroscopic;
2. they are not readily ground and polished;
3. due to the ready sublimability of the arsenic (V)-oxide at elevated temperatures, the physical properties of the glasses cannot be readily reproduced; and
4. they exhibit poor chemical stability.

It has already been proposed to prepare glass compositions from the molten arsenates or arsenites of metallic oxides. These glasses are possessed of a satisfactory permeability to infrared rays, however, the chemical stability of these glasses is inadequate.

In accordance with the invention it has now been found that glasses having a surprisingly good stability and extreme optical properties can be obtained from melts constituting a new type of quasi-di-component glass. According to the invention, one of the quasi-components comprises simple and/or complex inorganic fluorides and the other quasi-component comprises arsenic pentoxide.

This system possesses a very broad and varied glassiness range. It is, for instance, possible to manufacture glasses comprising 40 to 92 percent by weight of inorganic fluorides and 8 to 60 percent by weight of arsenic pentoxide.

The fact that these components can be fused to form excellent glasses is to be considered most surprising for, as is known, arsenic pentoxide is associated with the disadvantage that it sublimates at relatively low temperatures.

The glass compositions in accordance with the invention thus consist of arsenic pentoxide and metallic fluorides. In view of the fact that both components and particularly the fluorides, have their initial peak of infrared absorption only at very long wavelengths, the dispersion of these glasses in the infrared range is extremely small and they also give in the visible range a completely abnormal partial dispersion, similar to that of calcium fluoride, which render them particularly suitable for use in apochromates. The optical position of the glass compositions in accordance with the invention extends over a wide area. What is most noteworthy is the high IR permeability of the glasses of the invention.

As fluorides there come into consideration preferably the fluorides of the polyvalent elements in view of the fact that substantial amounts of alkali act to lower the chemical stability and increase the hygroscopicity of the resultant composition. Particularly favorable properties are associated with glass compositions containing large amounts of alkaline earth fluorides and aluminum fluoride. Therefore, the minimum content of these two fluorides should preferably not lie below 30 percent by weight and may be increased up to a maximum content of 92 percent by weight. Such a glass with respect to its optical properties comes substantially close to those of the pure fluorides.

The content of alkaline earth fluorides amounts preferably to about 15–75 percent by weight. The content in aluminum fluoride amounts to at least 2 percent by weight and preferably amounts to between 5 and 35 percent by weight. The glass range is particularly large if the contents of $CaF_2$ and $AlF_3$ are chosen so as to be substantially identical.

In order to prepare glasses having a smaller $\nu$-value, a substantial amount of lead fluoride is required. The lead fluoride may be present in amounts of up to 35 percent by weight $PbF_2$.

The possibilities of variation in the glass compositions according to the invention are extremely large. It is thus possible to use the conventional fluorides of Zn, Cd, Bi, of rare earths or of yttrium, as well as readily volatile simple fluorides of titanium, zirconium, niobium, tantalum and tungsten in the form of their more stable complexes, such as titanium barium fluoride, zirconium magnesium fluoride, etc. Even complex boron and silicon fluorides can be utilized advantageously, the latter compounds in amounts of up to 20 percent by weight. Surprisingly, when utilizing these compounds the high IR permeability is preserved up to a wavelength of $5.5\mu$ at a thickness of 5 mm. Even the fluorides of color-producing elements, such as Fe, Mn, Cu, etc., can be introduced into the glasses according to the invention. In certain instances as a result, the position of the absorption bands is altered as compared to that found in oxide glasses.

The scope of the invention extends also to glasses prepared from melts to which small amounts, i.e., up to 5 percent by weight of oxidic substances with the exception of $As_2O_5$ have been added. A partial replacement of arsenic pentoxide by phosphorous pentoxide also results in more stable glasses.

In table I, which follows, there are set out 12 illustrative compositions from which glasses have been obtained in accordance with the invention.

TABLE I (Values in Grams)

| No. | 1 | 2 | 3 | 4 | 5 | 6 |
|---|---|---|---|---|---|---|
| $As_2O_5$ | 20.0 | 35.0 | 50.0 | 45.0 | 39.0 | 25.0 |
| $AlF_3$ | 30.0 | 7.5 | 12.5 | 10.0 | 14.0 | 20.0 |
| $CaF_2$ | 30.0 | 7.5 | 12.5 | — | 7.0 | 20.0 |
| $BaF_2$ | 17.0 | 47.0 | 25.0 | 45.0 | 40.0 | 5.0 |
| $PbF_2$ | — | — | — | — | — | 30.0 |
| $MgF_2$ | 3.0 | 3.0 | — | — | — | — |

| No. | 7 | 8 | 9 | 10 | 11 | 12 |
|---|---|---|---|---|---|---|
| $As_2O_5$ | 25.0 | 25.0 | 21.5 | 25.0 | 25.0 | 25.0 |
| $AlF_3$ | 20.0 | 20.0 | 3.5 | 25.0 | 25.0 | 25.0 |
| $CaF_2$ | 20.0 | 20.0 | 3.5 | 25.0 | 25.0 | 25.0 |
| $BaF_2$ | 5.0 | 12.5 | 43.0 | 20.0 | 22.0 | 20.0 |
| $PbF_2$ | 25.0 | 10.0 | — | — | — | — |
| $ZnF_2$ | — | — | — | 5.0 | — | — |
| $K_2 6$ | 5.0 | — | — | — | — | — |
| $YF_3$ | — | — | — | — | 3.0 | — |
| $BaSiF_4$ | — | 12.5 | — | — | — | — |
| $CdF_2$ | — | — | — | — | — | 5.0 |
| $ThF_4$ | — | — | 28.5 | — | — | — |

The glasses according to the invention are prepared by melting the carefully blended mixture of the fluorides, rendered substantially dry, at 800°–850° C. and refining the melt at 850° C. up to a maximum of 1000° C. If excessive heating is resorted to, there results a loss of fluorine, oxygen and arsenic and furthermore insoluble residues occasionally separate out. Special refining agents are not required. The melting can be carried in a platinum crucible.

The refined batch is agitated by stirring up to about 650° to 750° C. and in the conventional manner then cast into steel molds and cooled. Because of the relatively high heat expansion, the cooling should not be carried out too rapidly.

In connection with a 100 g. melt (100 g. calculated glass) the following time periods should be observed:

| | |
|---|---|
| 30 min. | charging time |
| 30 min. | refining time |
| 15 min. | stirring time |
| $\geq$20 hours | cooling time |

The glasses can be manufactured with good optical homogeneity. They are extremely hard and can be readily polished and with the exception of glasses having high-lead contents are substantially colorless and nonhygroscopic. The chemical stability is in any event, adequate for producing optical finishes, i.e., high polishes.

Because of their high expansion, the above-described glasses are suitable also as solder glasses (e.g. for copper and $V_2A$). In view of the fact that the transformation temperature of the glasses is very high, they exhibit excellent dimensional stability.

In table II, which follows, additional examples of batches suitable for use as melts for forming glasses having the indicated properties are set out.

TABLE II

| No. | 13 | 14 | 15 | 16 | 17 |
|---|---|---|---|---|---|
| $As_2O_5$ | 25.0 | 30.0 | 15.0 | 20.0 | 8.0 |
| $AlF_3$ | 20.0 | 5.0 | 27.5 | 30.0 | 32.5 |
| $CaF_2$ | 20.0 | 5.0 | 27.5 | 30.0 | 32.5 |
| $BaF_2$ | 7.5 | 60.0 | 15.0 | 15.0 | 27.0 |
| $PbF_2$ | 20.0 | — | 15.0 | 5.0 | |
| $LaF_3$ | 7.5 | — | — | — | |
| $d(g./cm.^3)$ | 4.313 | 4.653 | 4.030 | 3.766 | |
| $\alpha(0.10^7$ cm.) 20–300° C. | 136.3 | 156.3 | 153.9 | 146.0 | |
| $T_g$ (°C.) | 451 | 420 | not det'd. | 434 | |
| $n_d$ | 1.5948 | 1.6018 | 1.5253 | 1.5067 | |
| $\nu_d$ | 48.59 | 55.64 | 58.37 | 67.50 | |

| No. | 18 | 19 | 20 | 21 | 22 |
|---|---|---|---|---|---|
| $As_2O_5$ | 60.0 | 25.0 | 24.0 | 24.0 | 24.0 |
| $BaF_2$ | 30.0 | 2.0 | 24.0 | 24.0 | 24.0 |
| $CaF_2$ | 5.0 | 31.5 | 24.0 | 24.0 | 24.0 |
| $AlF_3$ | 5.0 | 31.5 | 24.0 | 24.0 | 24.0 |
| $PbF_2$ | | 35.0 | | | |
| $ThO_2$ | | | 4.0 | | |
| $WO_3$ | | | | 4.0 | |
| $PbO$ | | | | | 4.0 |

In the drawings forming a part of this disclosure

Figure 2:
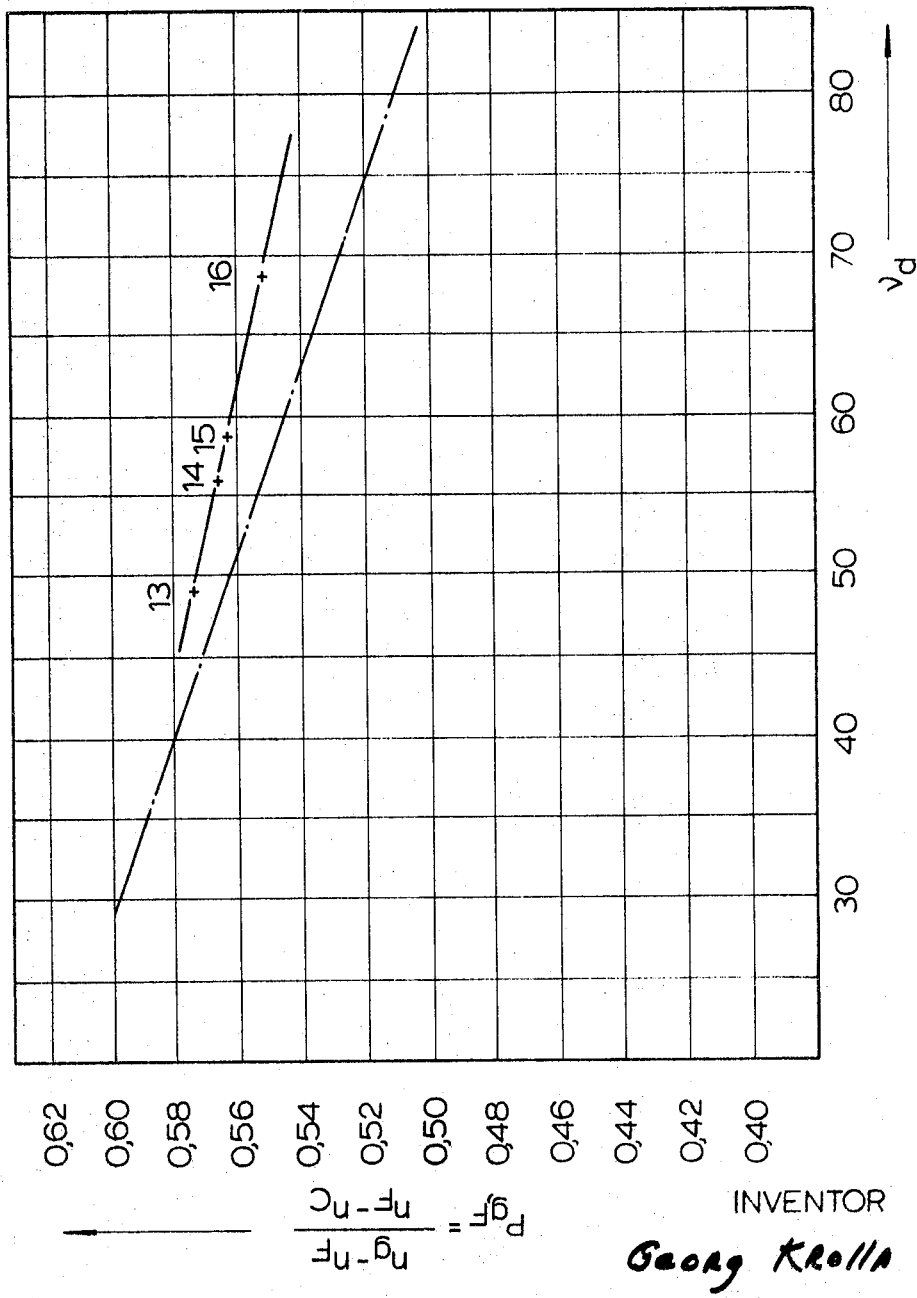
Figure 3:
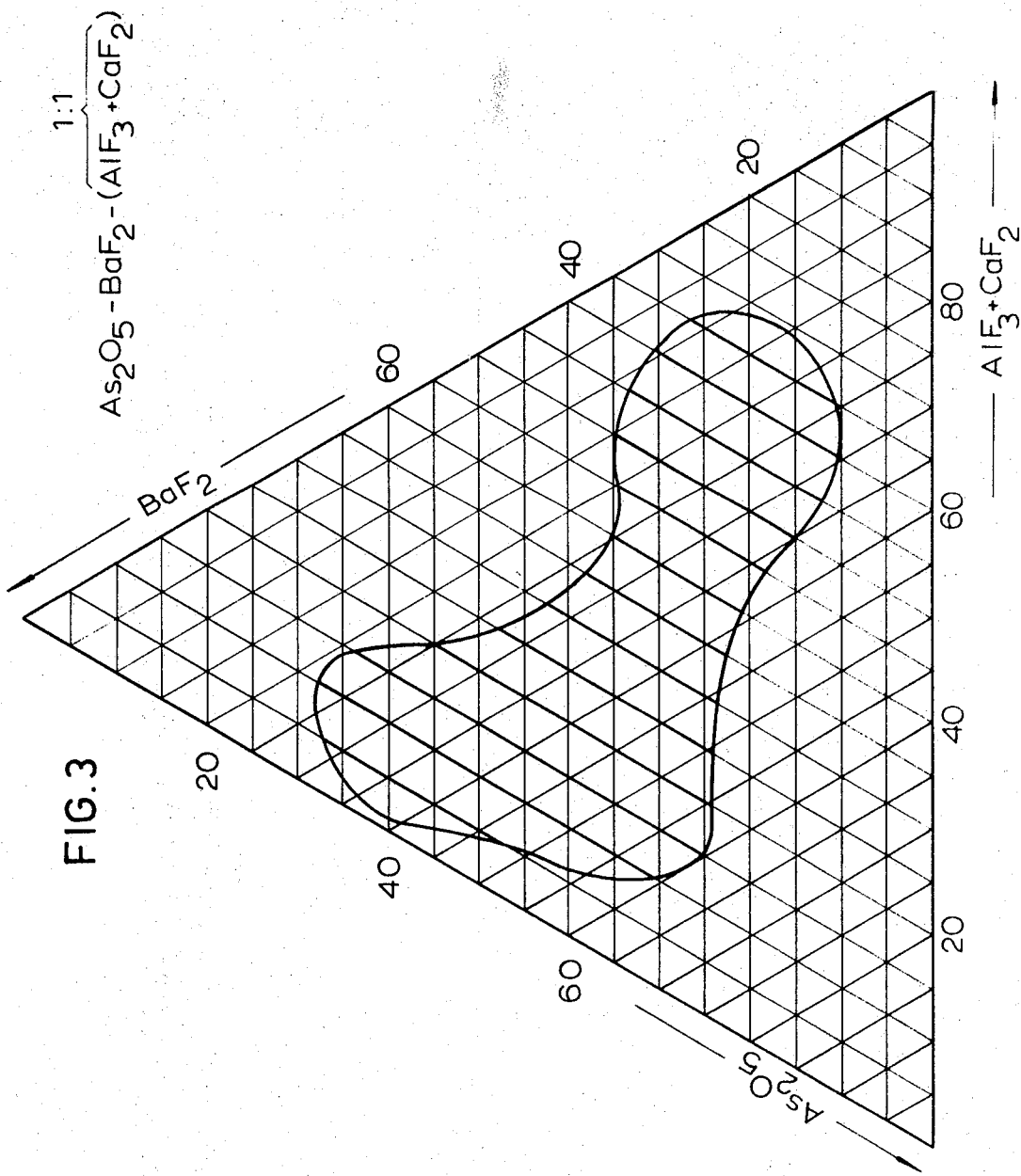
Figure 4:
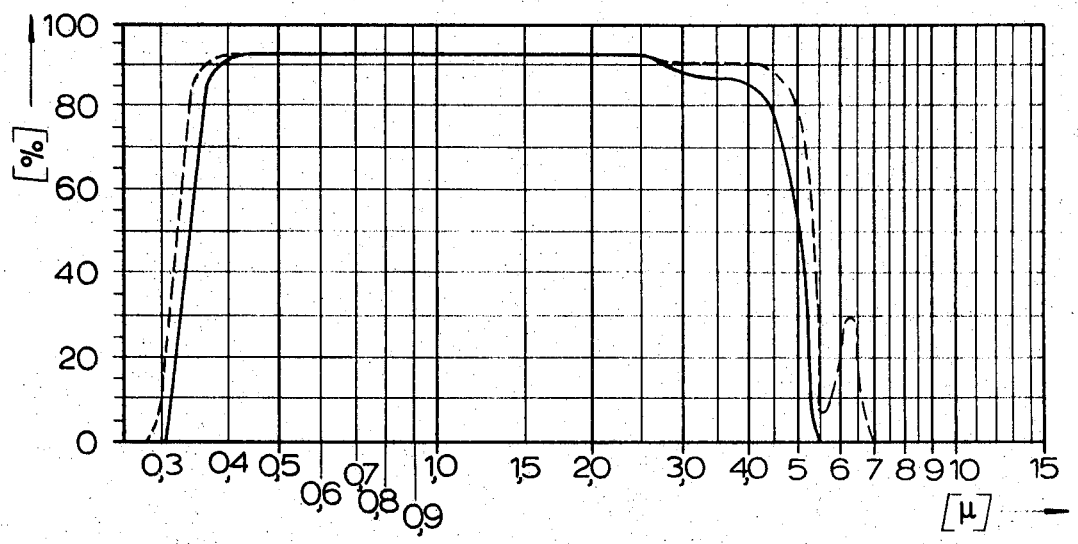

FIG. 1 graphically illustrates the dispersion in the infrared range;

FIG. 2 graphically illustrates the dispersion in the visible range of the glasses 13, 14, 15 and 16;

FIG. 3 graphically illustrates the pseudo-ternary system $As_2O_5$·$BaF_2$–$AlF_3$+$CaF_2$ in triangular coordinates; and FIG. 4 graphically illustrates the infrared permeability of glass no. 1 of table I.

In FIGS. 1 and 2, the dash and dot lines represents the straight "normal" line. The diagram according to FIG. 3 indicates percentage by weight. FIG. 4 illustrates the dependency of the transmission in percent from the wavelength expressed in $\mu$. The solid line donates 5 mm., the broken line, 2 mm.

What is claimed is:

1. Optical glass compositions consisting essentially of arsenic pentoxide in an amount of from 8 to 60 percent by weight and inorganic fluorides in an amount of from 92 to 40 percent by weight.

2. Optical glass compositions according to claim 1 wherein said inorganic fluorides are fluorides of elements having valence of at least 2.

3. Optical glass compositions according to claim 1 wherein said fluoride includes fluorides of aluminum or of the alkaline earth metals and wherein said fluoride of aluminum or alkaline earth metal constitute 30 to 92 percent by weight of said composition.

4. Optical glass compositions according to claim 3 containing 30 to 75 percent by weight of alkaline earth fluorides.

5. Optical glass compositions according to claim 3 containing at least 2 percent by weight of $AlF_3$ and at least 15 percent by weight of alkaline earth fluorides.

6. Optical glass compositions according to claim 3 containing 5 to 35 percent by weight $AlF_3$.

7. Optical glass compositions according to claim 1 containing 35 percent by weight of lead fluoride.

8. Optical glass compositions according to claim 1 wherein said fluorides are members of the group of simple fluorides of members selected from the group consisting of zinc, cadmium, bismuth, the rare earths, yttrium and thorium and complex fluorides of members selected from the group consisting of titanium, zirconium, niobium, tantalum, silicon, boron and tungsten.

9. Optical glass compositions according to claim 1 additionally containing up to 5 percent by weight of at least one metallic oxide.

10. Optical glass compositions according to claim 1 comprising: 20.0 parts by weight $As_2O_5$, 30.0 parts by weight $AlF_3$, 30.0 parts by weight $CaF_2$, 17.0 parts by weight $BaF_2$ and 3.0 parts by weight $MgF_2$.

11. Optical glass compositions according to claim 1 comprising: 35.0 parts by weight $As_2O_5$, 7.5 parts by weight $AlF_3$, 7.5 parts by weight $CaF_2$, 47.0 parts by weight $BaF_2$ and 3.0 parts by weight $MgF_2$.

12. Optical glass compositions according to claim 1 comprising: 50.0 parts by weight $As_2O_5$, 12.5 parts by weight $AlF_3$, 12.5 parts by weight $CaF_2$, 25.0 parts by weight $BaF_2$.

13. Optical glass compositions according to claim 1 comprising: 45.0 parts by weight $As_2O_5$, 10.0 parts by weight $AlF_3$ and 45.0 parts by weight $BaF_2$.

14. Optical glass compositions according to claim 1 comprising: 39.0 parts by weight $As_2O_5$, 14.0 parts by weight $AlF_3$, 7.0 parts by weight $CaF_2$ and 40.0 parts by weight $BaF_2$.

15. Optical glass compositions according to claim 1 comprising: 25.0 parts by weight $As_2O_5$, 20.0 parts by weight $AlF_3$, 20.0 parts by weight $CaF_2$, 5.0 parts by weight $BaF_2$ and 30.0 parts by weight $PbF_2$.

16. Optical glass compositions according to claim 1 comprising: 25.0 parts by weight $As_2O_5$, 20.0 parts by weight $AlF_3$, 20.0 parts by weight $CaF_2$, 5.0 parts by weight $BaF_2$, 25.0 parts by weight $PbF_2$ and 5.0 parts by weight $K_2TiF_6$.

17. Optical glass compositions according to claim 1 comprising: 25.0 parts by weight $As_2O_5$, 20.0 parts by weight $AlF_3$, 20.0 parts by weight $CaF_2$, 12.5 parts by weight $BaF_2$, 10.0 parts by weight $PbF_2$ and 12.5 parts by weight $BaSiF_6$.

18. Optical glass compositions according to claim 1 comprising: 21.5 parts by weight $As_2O_5$, 3.5 parts by weight $AlF_3$, 3.5 parts by weight $CaF_2$, 43.0 parts by weight $BaF_2$ and 28.5 parts by weight $ThF_4$.

19. Optical glass compositions according to claim 1 comprising: 25.0 parts by weight $As_2O_5$, 25.0 parts by weight $AlF_3$, 25.0 parts by weight $CaF_2$, 20.0 parts by weight $BaF_2$ and 5.0 parts by weight $ZnF_2$.

20. Optical glass compositions according to claim 1 comprising: 25.0 parts by weight $As_2O_5$, 25.0 parts by weight $AlF_3$, 25.0 parts by weight $CaF_2$, 22.0 parts by weight $BaF_2$ and 3.0 parts by weight $YF_3$.

21. Optical glass compositions according to claim 1 comprising: 25.0 parts by weight $As_2O_5$, 25.0 parts by weight $AlF_3$, 25.0 parts by weight $CaF_2$, 20.0 parts by weight $BaF_2$ and 5.0 parts by weight $CdF_2$.

22. Optical glass compositions according to claim 1 comprising: 25.0 parts by weight $As_2O_5$, 20.0 parts by weight $AlF_3$, 20.0 parts by weight $CaF_2$, 7.5 parts by weight $BaF_2$, 20.0 parts by weight $PbF_2$ and 7.5 parts by weight $LaF_3$.

23. Optical glass compositions according to claim 1 comprising: 30.0 parts by weight $As_2O_5$, 5.0 parts by weight $AlF_3$, 5.0 parts by weight $CaF_2$ and 60.0 parts by weight $BaF_2$.

24. Optical glass compositions according to claim 1 comprising: 15.0 parts by weight $As_2O_5$, 27.5 parts by weight $AlF_3$, 27.5 parts by weight $CaF_2$, 15.0 parts by weight $BaF_3$ and 15.0 parts by weight $PbF_2$.

25. Optical glass compositions according to claim 1 comprising: 20.0 parts by weight $As_2O_5$, 30.0 parts by weight $AlF_3$, 30.0 parts by weight $CaF_2$, 15.0 parts by weight $BaF_2$ and 5.0 parts by weight $PbF_2$.

* * * * *